M. A. HARRIS.
CLUTCH COUPLING.
APPLICATION FILED JAN. 20, 1912.

1,040,317.

Patented Oct. 8, 1912.

Witnesses
Byron B. Collings
H. V. Primm

Inventor
M. A. Harris,
Wilkinson, Fisher & Witherspoon
Attorneys.

UNITED STATES PATENT OFFICE.

MOSES ALBERT HARRIS, OF WESTFIELD, NEW JERSEY, ASSIGNOR OF ONE-HALF TO LAWRENCE A. CLARK, OF WESTFIELD, NEW JERSEY.

CLUTCH-COUPLING.

1,040,317.  Specification of Letters Patent.  Patented Oct. 8, 1912.

Application filed January 20, 1912. Serial No. 672,417.

*To all whom it may concern:*

Be it known that I, MOSES ALBERT HARRIS, a citizen of the United States, residing at Westfield, in the county of Union and State of New Jersey, have invented certain new and useful Improvements in Clutch-Couplings; and I do hereby declare the following to be a full, clear, and exact description of the invention, such as will enable others skilled in the art to which it appertains to make and use the same.

My invention relates to an improved power clutch, and it consists in the constructions, combinations and arrangements herein described and claimed.

An object of my invention is to provide an improved clutch adapted to be thrown into and out of engagement with a minimum of frictional resistance, and especially adapted for use as an automatic release gear in looms.

A further object of my invention is to provide a strong and compact clutch which will act with certainty under all practical conditions, and adapted to be readily adjusted to compensate for wear.

Figure 1:
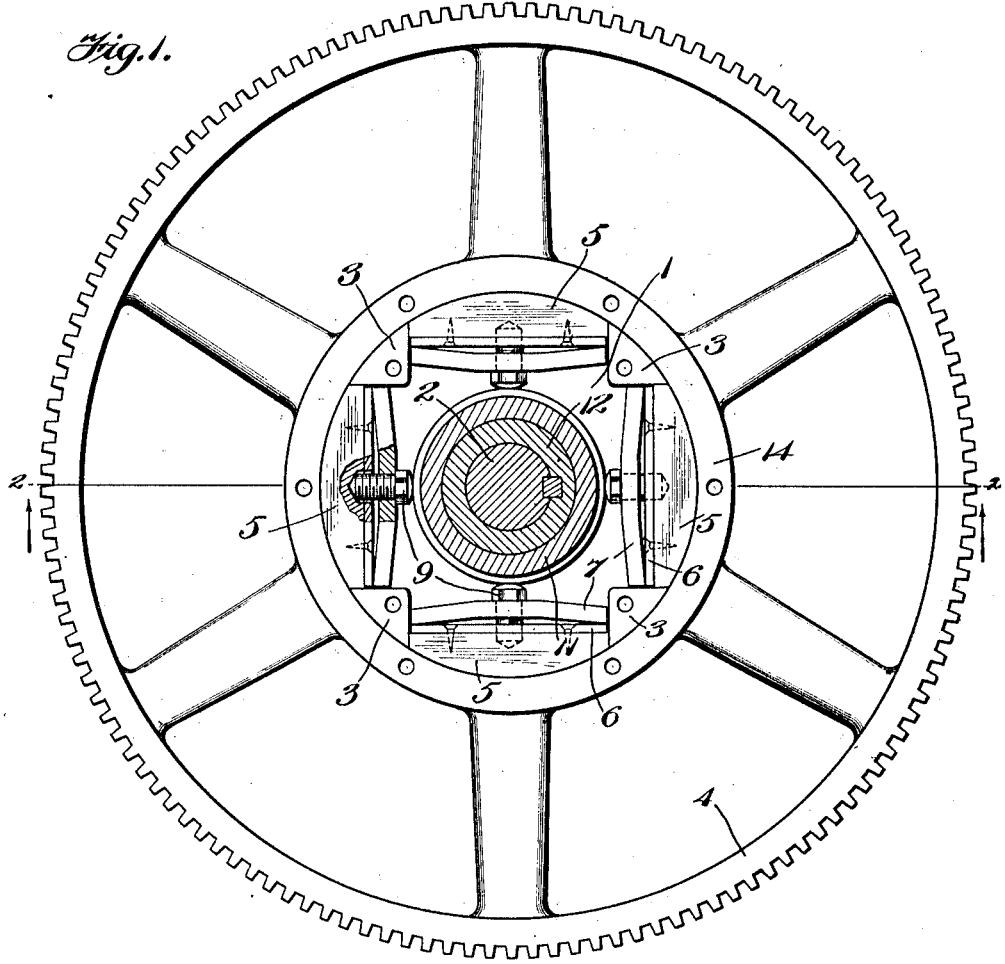
Figure 2:
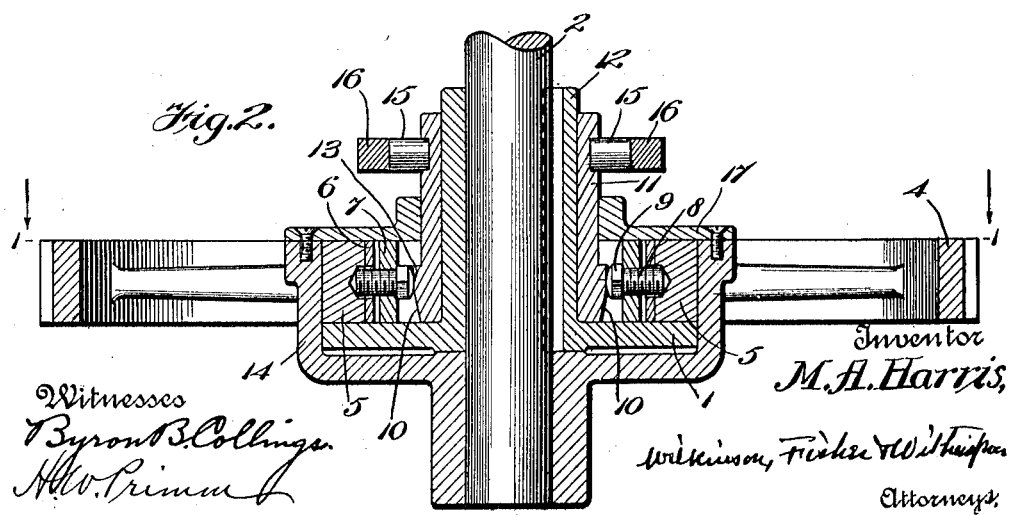

In the accompanying drawings, forming a part of this application, and in which similar reference symbols indicate corresponding parts in the several views:—Figure 1 is a side elevation, illustrating one embodiment of my invention; and Fig. 2 is a section on the line 2—2 of Fig. 1.

Referring to the drawings, 1 indicates a drive disk keyed on a power shaft 2 and provided with radial guides 3; a driven member 4, such as a gear or pulley, being loosely mounted on said shaft 2, or keyed to a co-axially arranged driven shaft.

Friction members, such as blocks 5, of wood or other suitable material, are shown provided with metal backings 6 supported on resilient seats comprising bowed metal plates 7; said blocks 5 and resilient seats 7 being slidably mounted in the radial guides 3. Screws 8 are adjustably threaded in the resilient plates 7, and provided with contact heads 9 for engagement with the cone 10 of a clutch member 11 shiftably mounted on the hub 12 of said drive disk 1; said cone 10 being shown terminating in a cylindrical portion 13 for maintaining the friction blocks 5 in actuating engagement with the interior of the hollow hub 14 of the driven wheel 4. The member 9 can be shifted in any usual manner, as by pins 15 extending from a pivoted yoke 16 into an annular slot in said member; the yoke 16 may be either manually or automatically operated, as by being connected to the let-off mechanism of a loom. The hollow hub 14 of the drive wheel 4 is provided with a closure 17, which constitutes a retaining guide for the blocks 5 and resilient members 7 and incloses the parts in a dust proof casing.

I have illustrated and described preferred and satisfactory constructions, but changes could be made within the spirit and scope of my invention.

I claim:—

1. A clutch comprising a driven member provided with a hollow hub, a drive disk, resilient seats carried thereby, friction blocks supported by said seats, contact heads adjustably secured to said seats for engagement with said hollow hub, a shiftable member, and means for shifting said member into engagement with said heads.

2. A clutch comprising a driven member provided with a hollow hub, a drive disk, resilient seats slidably mounted thereon, friction blocks supported by said seats for engagement with said hollow hub, contact heads adjustably secured to said seats, a shiftable member, and means for shifting said member into engagement with said heads.

3. A clutch comprising a driven member provided with a hollow hub, a drive disk, radial guides thereon, resilient seats and friction blocks slidably mounted in said guides for engagement with said hollow hub, contact heads adjustably secured to said seats, a shiftable member, and means for shifting said member into engagement with said heads.

In testimony whereof, I affix my signature, in presence of two witnesses.

MOSES ALBERT HARRIS.

Witnesses:
 ESTELLE CLARK HARRIS,
 LAWRENCE A. CLARK.

---

Copies of this patent may be obtained for five cents each, by addressing the "Commissioner of Patents, Washington, D. C."